United States Patent Office 3,325,352
Patented June 13, 1967

3,325,352
ANESTHESIA METHOD AND COMPOSITIONS
USING 1,1,1-TRIFLUOROETHYL CHLORIDE
Morton Shulman, Des Plaines, Ill., assignor of one-half to Max S. Sadove, Oak Park, Ill.
No Drawing. Filed Mar. 19, 1965, Ser. No. 441,295
15 Claims. (Cl. 167—52)

The present invention relates generally to anesthesia methods and more particularly to an anesthesia method characterized by extremely rapid action, excellent moment-to-moment control, a wide range of potency with safety, and rapid emergence from the state of anesthesia without convulsion during the emergence or recovery period. The invention also relates to an anesthetic mixture or composition.

In methods of anesthesia it is desirable to employ an anesthetic agent which is both effective and safe over a wide range of concentrations. Most of the agents which have been ued heretofore are either extremely potent with the maximum allowable clinical concentration being less than 10% (expressed as a volume percent of a mixture of the agent plus a carrier gas at room temperature and one atmosphere pressure), or else they tend to lack sufficient potency so that concentrations as high as 80%, for example, are inadequate to maintain anesthesia without supplementation.

The present invention relates to an anesthesia method and composition employing an agent which is both potent and safe over a relatively wide range of concentrations. The agent employed in the present invention is the halogenated hydrocarbon 1–1–1 trifluoroethyl chloride ($CF_3CH_2Cl$), hereinafter sometimes referred to as TFEC. This agent boils at 40° F., at one atmosphere of pressure, and thus is a gas at room temperature. The agent has a mild, sweet odor that is non-irritating; and mixtures of the agent and oxygen are non-explosive.

As used in accordance with the anesthesia method of the present invention, the halogenated hydrocarbon TFEC and the anesthesia composition in which it is employed should be relatively pure, which means that the TFEC and the anesthesia composition are devoid of toxic amounts of other halogenated hydrocarbons (a hydrocarbon in which a halogen replaces one of the hydrogens or one of the carbons). A toxic amount is a quantity which produces a toxic effect, as described below. TFEC having a purity of 99.6 vol. percent has been used effectively in accordance with the present invention.

TFEC, of desired purity, is commingled with a carrier gas to form an anesthetic mixture or composition. The carrier gas may be any one of those heretofore conventionally used for this purpose, e.g., oxygen, nitrous oxide or air. The resulting mixture must have a minimum of 15% uncombined oxygen, and preferably a minimum of 20% uncombined oxygen, so as to avoid toxic effects when the mixture is introduced into the respiratory system of the subject to be anesthetized.

The proportion of TFEC in the mixture is determined by the subject to be anesthetized and the surgery being performed on the subject. The minimum proportion of TFEC is usually determined by that amount which will cause anesthesia in the subject; and anesthesia means a condition in which the subject undergoes both a completely reversable loss of consciousness and a completely reversable loss of reaction to painful stimuli.

The maximum proportion of TFEC in the mixture should be less than that proportion which has a toxic effect on the subject to be anesthetized. A toxic effect is characterized by excessive respiratory and/or circulatory depression in the subject.

Excessive respiratory depression occurs when the volume of gas exchanged between the lungs of the subject and the outside anesthetic system decreases significantly. This can be determined by a spirometer, a conventional measuring instrument.

Circulatory depression can be determined by noting the decrease in the amount of blood flowing, and this is indicated by any one or more of: (1) decrease in heart rate; (2) decrease in the pumping force of the heart; (3) decrease in the rate of blood flow in the blood vessels; and (4) decrease in the arterial blood pressure. All of the indicia (1)-(4) for ascertaining decreases in the amount of blood flow can be determined by conventional instruments.

It should be noted that the above-described criteria for determining maximum and minimum proportions of anesthetic agent in the anesthetic mixture are conventional in the field of anesthesiology, and the considerations involved are well within the skill of practitioners of anesthesiology.

In an embodiment of an inhalation method in accordance with the present invention, the anesthetic mixture is directly introduced into the respiratory system of the subject. Direct inhalation introduction can be accomplished in two ways. One way is to place a mask over both the mouth and the nose of the subject and introduce the gas through the mask. Another way is by endotracheal intubation, ie., introducing a tube by way of either the nose or mouth of the subject through the larynx, or by way of a specially opened aperture in the trachea (which would require a tracheotomy), with the intubation tube terminating inside the trachea (wind pipe) of the subject.

The anesthetic mixture, containing proportions of TFEC in amounts which are effective but safe (as defined above) is directly introduced into the respiratory system of the subject, and anesthesia is maintained by continuously circulating the anesthetic mixture through the respiratory system. During operation of the method, it is important that carbon dioxide, which is normally generated in the subject's respiratory system, be removed from the respiratory system; and it is preferable that nitrogen be removed from the respiratory system. If carbon dioxide is not removed, it will accumulate in the respiratory system and have toxic effects. If nitrogen is not removed, it dilutes the effect of the anesthetic gas. Either gas can be removed by venting the exhaust from the respiratory system so that the exhaust is not recirculated back into the respiratory system. If it is desired to recirculate the exhaust from the respiratory system, carbon dioxide can be removed by circulating the exhaust through a conventional carbon dioxide absorber (e.g., a canister containing soda-lime) before introduction of the exhaust back into the respiratory system.

Recovery from a state of anesthesia can be provided merely by discontinuing the circulation of the anesthetic mixture through the respirator system of the subject, and by circulating oxygen or air through the respiratory system. In the method of the present invention, during the recovery period (the time during which the subject passes from an anesthetic state to a non-anesthetic state) there is good postrecovery analgesia (a state in which the subject undergoes diminished perception of pain). It should also be noted that there is marked analgesic action when the subject method is performed using subanesthetic concentrations of TFEC, that is, concentrations less than that causing both a loss of consciousness and a loss of reaction to pain. When producing a state of anesthesia in a subject, the subject first passes through a state of analgesia.

The embodiments of the subject method described above are inhalation methods. It is also possible, in accordance with the present invention, to produce anesthesia by an intravenous method. This involves mixing the TFEC with a non-toxic intravenous carrier (e.g., a suspension of vegetable fat in water) and directly introducing the resulting mixture (which may be a solution or suspension) by injecting it intravenously into the subject, with the proportion of TFEC in the solution being that which is effective but safe, as defined above.

*Example 1*

A method in accordance with the present invention was tested on man using an anesthetic mixture of TFEC and oxygen. The mixture was directly introduced into the respiratory system of the subject using a face mask. Carbon dioxide was removed from the respiratory system and the amount of carbon dioxide in the respiratory system was maintained below that which is toxic. Excellent analgesia was obtained when the mixture contained 1–10% TFEC. Anesthesia was noted during a time when the mixture contained 14% TFEC. An effective and safe anesthetic range for humans comprises a mixture containing 10–20% TFEC.

*Example 2*

An anesthetic mixture in accordance with the present invention was tested on mice in the following manner. Groups of three mice were placed into a stoppered bottle, and an atmosphere of approximately 100% oxygen was produced in the bottle. A measured amount of oxygen was then evacuated from the bottle and replaced with TFEC of desired purity (e.g., 99.6 vol. percent). In this manner, the mice were exposed to a mixture of oxygen and known concentrations of TFEC. The bottle was then sealed and rotated. Loss of the righting reflex was taken as the end point for the onset anesthesia. Exposure to a mixture containing a given concentration of TFEC lasted for 10 minutes. If anesthesia did not develop during this period of time, the concentration of TFEC was regarded as subanesthetic. If apnea (concession of breathing) developed, the concentration was regarded as toxic. Different groups of three mice were used for each tested concentration.

A mixture containing TFEC becomes anesthetic to 50% of the exposed mice ($AD_{50}$) when the inhaled concentration reaches 8%. The mixture is toxic to 50% of the exposed mice ($LD_{50}$) when the inhaled concentration reaches 21%. For mice, the anesthetic index ($LD_{50}/AD_{50}$) for the mixture is 2.6, and the anesthetic range ($LD_{50}-AD_{50}$) is 13%.

Induction time was extremely rapid with a concentration of 15% producing anesthesia in about 45 seconds. Recovery was also very rapid. Recovery time after 10 minutes of anesthesia was 30 seconds. Good postrecovery analgesia was noted and persisted for 3–4 minutes. The mice did not appear to suffer any ill effects from the anesthetic mixture. At no time were any convulsive movements noted.

*Example 3*

The anesthetic mixture was further tested on mice as follows. Twelve mice were each anesthetized, in the manner of Example 2, on each of 12 consecutive days. The mice were sacrificed after the twelfth day by overdosage with TFEC. Specimens of heart, lung, liver, kidney, adrenal, spleen and pancreas were taken from each animal and subjected to microscopic examination.

Prior to sacrifice, not of the mice appeared to exhibit any ill effects from the repeated exposure to the anesthetic mixture. Microscopic examination of the various above-noted organs demonstrated no pathology that could be attributed to the repeated exposure to the anesthetic mixture.

To avoid the toxic effects of carbon dioxide accumulating in the atmosphere within a stoppered bottle containing the mice, soda-lame was included within the bottle, in a quantity adequate to remove the carbon dioxide, in situations where the mice were exposed to the atmosphere within a bottle for an extended length of time.

*Example 4*

An anesthesia method, in accordance with the present invention, was tested on dogs, as follows. Ten dogs were each immobilized with succinylcholine (a paralysis inducer), intubated, and placed on artificial respiration. Under local anesthesia, cannulas (hollow tubes) were placed into the femoral artery and vein in order to record pressures, and an electrocardiogram was recorded. After adequate respiratory activity had returned, indicating the end of clinical action of the succinylcholine, the intubation tube was communicated with a conventional external anesthetic system, and nitrogen was washed out of the dog's respiratory system with high flows of oxygen. The external system included a soda-lime canister for absorbing $CO_2$ inasmuch as the exhaust (exhaled gases) from the dog was to be recirculated. Control readings of respiratory rate, pulse rate, intra-arterial pressure, central venous pressure and EKG were taken; and the entire system, consisting of the external anesthetic system and the dog's respiratory system, was then closed. Oxygen was admitted to the system as required, and TFEC was mixed with the oxygen in such a manner as to gradually increase the inspired concentration of TFEC in the mixture. Gas samples were periodically removed from the closed system and concentrations of TFEC were measured in a conventional manner using a gas chromatograph.

Table I below shows the minimum, mean and extreme TFEC concentrations, in volume percent, which produced given effects.

TABLE I

|  | Conc. for anesthesia, percent | Conc. for noticeable respiratory depression, percent | Conc. for respiratory arrest, percent | Conc. to drop systolic arterial pressure below 100 mm. Hg, percent | Conc. for asystole (cessation of heart beat), percent |
|---|---|---|---|---|---|
| Min | 8 | 17 | 23 | 20 | 30 |
| Max | 13 | 32 | 41 | 60 | 80 |
| Mean | 10 | 23 | 29 | 35 | 59 |

Profound analgesia was noted when the animal inspired subanesthetic concentrations. The onset of anesthesia was usually marked by tachypnea (rapid respiration) and tachycardia (rapid heart rate). The tachycardia gradually subsided, as the inspired concentration of TFEC was increased, and gave way to a relative bradycardia (low heart rate) as impending circulatory collapse became apparent. The tachypnea partially subsided as the concentration was increased. However, respiratory depression manifested itself more as a reduction of volume of gas exchanged with each respiration than a reduction of the rate of respiration.

The central venous pressure remained at or near control levels during most of the anesthesia. It began to rise only when impending circulatory collapse was present.

The electrocardiogram was remarkably stable so long as ventilation was adequate. An inversion of the T wave was noted as the inspired concentration of TFEC was increased, but there was no reproducible concentration at which this occurred. In 4 of the 10 dogs, this was present in the control period (when no TFEC was being circulated), while in one dog it did not occur until the concentration of TFEC was 76%, the concentration which produced asystole (cessation of heart beat). Depression of the ST segment occurred quite often in very deep anesthesia.

Death from overdosage of TFEC was caused in all cases by asystole. This was usually preceded by first a complete atrioventricular block with idioventricular rhythm and then dissociation of the electrical and mechanical activity of the heart. Once asystole had occurred, the dogs could easily be resuscitated by sternal compression (a method of resuscitation involving pressing on the sternum) and artificial ventilation with high flows of oxygen to wash out the TFEC. Vasopressors (drugs which increase blood pressure) were sometimes needed to supplement the resuscitation.

The progessive respiratory and circulatory depression, caused by increasing concentrations of TFEC, could be rapidly and completely reversed by diminishing the inspired concentration. This reversal was uniformly present within less than one minute after changing the concentration.

The dogs would sometimes develop running motions during deep TFEC anesthesia; however, this appears to be a species variant because other animals (rabbit, cat, monkey, mouse, rat) do not show this.

Therefore, in accordance with the present invention, there is provided an anethesia method utilizing an anesthetic mixture which is non-explosive, non-irritating and has a wide range of use, with the method being characterized by extremely rapid action, excellent moment-to-moment control and rapid emergence. In addition, there is provided a marked state of analgesia in subanesthetic concentrations.

As used herein, the term "vol. %" means percent of volume at room temperature and one atmosphere of pressure.

The foregoing detailed description has been given for clearness of understanding only, and no unnecessary limitations should be understood therefrom, as modifications will be obvious to those skilled in the art.

What is claimed is:

1. A method for producing at least reduced perception of pain in a human, dog, cat, rat, rabbit or monkey subject, said method comprising the step of:
  introducing into and circulating through the respiratory system of said subject a non-toxic, non-inflammable gaseous mixture consisting essentially of: (1) a relatively pure quantity of $CF_3CH_2Cl$ in sufficient vol. percent to produce a state of reduced perception of pain in the subject, but less than that vol. percent which is toxic to said subject; (2) from zero to less than a toxic vol. percent of other halogenated hydrocarbon anesthetics; and (3) a balance consisting essentially of a non-toxic carrier gas containing sufficient uncombined oxygen to provide said mixture with an uncombined oxygen content of at least 15 vol. percent.

2. A method as recited in claim 1 wherein said mixture is directly introduced into the respiratory system of said subject.

3. A method as recited in claim 1 wherein said subject is man, and said mixture contains 1–10 vol. percent of said $CF_3CH_2Cl$.

4. A method as recited in claim 1 wherein said subject is man, and said mixture contains 10–20 vol. percent of said $CF_3CH_2Cl$.

5. A method as recited in claim 1 wherein said $CF_3CH_2Cl$ has a purity of at least 99.6 vol. percent.

6. A method as recited in claim 1 wherein said carrier gas is selected from the group consisting of air, uncombined oxygen, nitrous oxide in less than toxic amounts and combinations thereof, and the proportions of uncombined oxygen in said mixture is at least 20 vol. percent.

7. A method as recited in claim 1 wherein the proportion of $CF_3CH_2Cl$ in said mixture is 1–20 vol. percent.

8. A method as recited in claim 1 wherein the proportion of $CF_3CH_2Cl$ is 1–14 vol. percent.

9. A method as recited in claim 1 wherein:
  said $CF_3CH_2Cl$ has a purity of at least 99.6 vol. percent; and said carrier gas is selected from the group consisting of air, uncombined oxygen, nitrous oxide in less than toxic amounts and combinations thereof, and the proportion of uncombined oxygen in said mixture is at least 20 vol. percent.

10. A method as recited in claim 1, said method comprising the additional steps of:
  continuously circulating said mixture through said respiratory system of said subject to maintain said state;
  exhausting said mixture which has been circulated through said respiratory system;
  exhausting gaseous carbon dioxide from the respiratory system of the subject, together with the exhausted mixture, and controlling the amount of carbon dioxide in the respiratory system of the subject to less than a toxic amount;
  and providing recovery from said state by discontinuing the circulation of said mixture and by circulating uncombined oxygen through the respiratory system;
  said recovery occurring without convulsions during the period of the recovery.

11. A method as recited in claim 10 and comprising:
  removing uncombined nitrogen from the respiratory system of said subject together with the exhausted mixture;
  and venting the gas exhausted from said respiratory system to prevent recirculation of said exhausted gas.

12. A method as recited in claim 10 and comprising:
  recirculating the exhausted mixture back through the respiratory system;
  and removing at least part of the exhausted carbon dioxide associated with the exhausted mixture from the recirculated mixture before said recirculating step.

13. A method for producing at least reduced perception of pain in a human, dog, cat, rat, rabbit or monkey subject, said method comprising the step of:
  directly introducing into said subject a non-toxic, non-inflammable fluid mixture consisting essentially of (1) a relatively pure quantity of $CF_3CH_2Cl$ in sufficient vol. percent to produce a state of reduced perception of pain in the subject, but less than that vol. percent which is toxic to said subject; (2) from zero to less than a toxic vol. percent of other halogenated hydrocarbon anesthetics; and (3) a balance consisting essentially of a non-toxic fluid carrier.

14. A method as recited in claim 13 and comprising:
  dissolving said $CF_3CH_2Cl$ in a non-toxic liquid carrier to produce a liquid mixture;
  and directly introducing said liquid mixture intravenously into said subject.

15. A method as recited in claim 14 wherein said carrier is vegetable fat.

References Cited

UNITED STATES PATENTS 3,097,133   7/1963   Suckling _____ 167—52

OTHER REFERENCES

Chemical Abstracts Subject Index, vol. 40, 1946, p. 8345 (2-chloro-1,1,1-trifluoro).

Dripps et al.; Introduction of Anesthesia, W. B. Saunders Co., 1957, Philadelphia, pp. 21 to 26.

Robbins: J. Pharmacology and Exist Theraps, vol. 86, pp. 197 to 204, 1946.

ALBERT T. MEYERS, *Primary Examiner.*

JULIAN S. LEVITT, *Examiner.*

JEROME D. GOLDBERG, *Assistant Examiner.*